United States Patent
Hong

(10) Patent No.: US 9,426,655 B2
(45) Date of Patent: Aug. 23, 2016

(54) LEGAL AUTHENTICATION MESSAGE CONFIRMATION SYSTEM AND METHOD

(71) Applicant: SECUVE CO., LTD., Seoul (KR)

(72) Inventor: Ki-Yoong Hong, Seoul (KR)

(73) Assignee: SECUVE CO., LTD., Seoul (KR)

( * ) Notice: Subject to any disclaimer, the term of this patent is extended or adjusted under 35 U.S.C. 154(b) by 0 days.

(21) Appl. No.: 14/424,576

(22) PCT Filed: Mar. 20, 2014

(86) PCT No.: PCT/KR2014/002373
§ 371 (c)(1),
(2) Date: Feb. 27, 2015

(87) PCT Pub. No.: WO2014/148854
PCT Pub. Date: Sep. 25, 2014

(65) Prior Publication Data
US 2016/0021534 A1     Jan. 21, 2016

(30) Foreign Application Priority Data
Mar. 20, 2013 (KR) .................. 10-2013-0029725

(51) Int. Cl.
| | |
|---|---|
| H04W 12/06 | (2009.01) |
| H04W 12/12 | (2009.01) |
| H04L 29/06 | (2006.01) |
| H04W 12/10 | (2009.01) |
| H04W 4/14 | (2009.01) |
| H04W 8/06 | (2009.01) |
| H04W 88/02 | (2009.01) |

(52) U.S. Cl.
CPC ............. *H04W 12/06* (2013.01); *H04L 63/126* (2013.01); *H04L 63/1483* (2013.01); *H04W 4/14* (2013.01); *H04W 12/10* (2013.01); *H04W 12/12* (2013.01); *H04W 8/06* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 2002/0032661 | A1* | 3/2002 | Schuba | G06Q 20/02 705/64 |
| 2008/0086532 | A1* | 4/2008 | Cunningham | G06Q 10/107 709/206 |
| 2012/0066498 | A1* | 3/2012 | Engert | G06G 21/51 713/170 |

FOREIGN PATENT DOCUMENTS

| | | |
|---|---|---|
| KR | 20050032749 | 4/2005 |
| KR | 20120092857 | 8/2012 |
| KR | 20130026265 | 3/2013 |

* cited by examiner

*Primary Examiner* — Daniel Lai
(74) *Attorney, Agent, or Firm* — IPLA P.A.; James E. Bame

(57) ABSTRACT

Provided is a system for preventing personal information leakage and, more particularly, related to a legal authentication message confirmation system and method which enables a user to identify whether an authentication message transmitted to the user's mobile communication terminal during user authentication originates from a trusted source, thereby preventing damage caused by pharming, smishing, and the like, such as personal information leakage and small sum payment fraud.

11 Claims, 9 Drawing Sheets

LEGAL AUTHENTICATION MESSAGE CONFIRMATION SYSTEM AND METHOD

BACKGROUND

The present invention relates generally to a system for preventing the leakage of personal information and, more particularly, to a system and method for checking a legitimate authentication message, which determine whether a source that sent an authentication message to a mobile communication terminal of a user is a reliable source, thus preventing damages such as the leakage of personal information and micropayment fraud caused by pharming and smishing.

With the high-speed realization, popularization and diversification of the Internet, the Internet not only provides much convenience to people, but also causes many undesirable side effects. The leakage of data, the forgery and falsification of data, and the illegitimate use and leakage of personal information over the Internet may be regarded as such side effects. In particular, as accidents such as the leakage of personal information have recently and frequently occurred, the protection of personal information and the exact identification of persons have emerged as problems. In order to solve such problems, various online identification methods have been presented.

One of the identification methods is an identity authentication method using a mobile phone. Typically, identity authentication using a mobile phone is configured to identify a user himself or herself using personal information registered in a mobile communication company, and perform possession-based authentication using a Short Message Service (SMS) including an authentication number so as to determine whether the user possesses the mobile phone.

In this way, various types of security services have been utilized to protect personal information. However, hacking techniques have more and more diversified and intelligent.

In particular, widely attempted are pharming and smishing techniques, which force a user to access a fake webpage (hereinafter referred to as a "pharming website") even if the user enters an exact webpage address via his or her web browser and which cause the personal information of the user to be stolen. Accordingly, there is worry that this may result in larger damage than in the case of a conventional phishing technique.

Further, pharming is performed in such a way that, when a user accesses a pharming website and uses a service requiring identity authentication using a mobile phone, a fake authentication message (hereinafter referred to as a "pharming authentication message") required for mobile phone possession-based authentication for identity authentication is sent to the mobile communication terminal of the user, thus prompting the user to be authenticated.

In this case, the user does not recognize that he or she accesses the pharming website and will trust the corresponding website upon receiving even the authentication message.

Further, smishing is configured to send an SMS message such as a free coupon, a smart statement, and a mobile gift certificate (hereinafter referred to as a "smishing message") and to install a malicious code at the moment at which the user clicks an address in the message, extract personal information, and perform micropayments in the name of the user.

As described above, a conventional mobile communication terminal is problematic in that it is impossible to determine whether a received SMS message is a legitimate message, thus causing the user to easily suffer financial fraud attributable to pharming and smishing techniques.

Further, a conventional identity authentication method is problematic in that it is impossible for the user to determine whether a received authentication message is a pharming authentication message or a legitimate authentication message.

Furthermore, the conventional identity authentication method is problematic in that the user does not know whether the received authentication message is a legitimate authentication message, trusts the received message, and enters an authentication number, thus causing personal information to be easily leaked. Furthermore, a serious problem may arise in that users are damaged by being financially swindled.

SUMMARY OF THE INVENTION

Accordingly, an object of the present invention is to provide a system and method for checking a legitimate authentication message, which determine whether a source that sent an authentication message to a mobile communication terminal of a user is a reliable source, thus preventing damages such as the leakage of personal information and micropayment fraud caused by pharming and smishing.

A system for checking a legitimate authentication message according to the present invention to accomplish the above object includes a source checking server for, when an authentication message legitimacy determination request signal including origination identification information is received, determining whether a source that sent an authentication message causing the authentication message legitimacy determination request signal is a legitimate source, based on the origination identification information included in the received signal, and providing notification of results of the determination; and a mobile communication terminal for, when a message is received, analyzing the message, determining whether the message is an authentication message, detecting origination identification information if the message is the authentication message, transmitting the authentication message legitimacy determination request signal including the origination identification information to the source checking server, and processing the authentication message based on result information when the result information is received from the source checking server in response to the authentication message legitimacy determination request signal.

The mobile communication terminal may include a communication unit for receiving the message through a mobile communication network and performing data communication with the source checking server through a wired/wireless Internet; and a control unit for receiving the message via the communication unit, determining whether the message is an authentication message, accessing the source checking server via the communication unit, and performing source authentication on a source that sent the authentication message, wherein the control unit may include a message reception detection unit for monitoring whether a message has been received through the mobile communication network, and hooking a received message when the message is received; an authentication message determination unit for determining whether the received message is an authentication message; a verification information detection unit for, if the received message is the authentication message, detecting origination identification information; a source checking unit for transmitting an authentication message legitimacy determination request signal including the origination identification information to the source checking server, and receiving result information from the source checking server; and a legitimate authentication message determination unit for, if the result information is received, and the result information indicates that the received authentication message has been sent from a legitimate source, providing notification of reception of the hooked message.

The legitimate authentication message determination unit may be configured to, if the result information indicates that the authentication message is not sent from a legitimate source, delete the hooked message.

The system may further include a message sending server for, when an event to send an authentication message to the mobile communication terminal occurs, generating and storing a unique verification value for an authentication message to be sent, and sending an authentication message including origination identification information and the verification value to the mobile communication terminal; and a service server unit including a service server for, when a source inquiry request signal is received, comparing a verification value included in the received source inquiry request signal with stored verification values, determining whether the verification value is a verification value generated by the service server, and transmitting source authentication results including result information of the determination to the source checking server, wherein the source checking server may include a business information database (DB) for storing pieces of origination identification information and information of service server units corresponding to the respective pieces of origination identification information, and wherein the mobile communication terminal is configured to, when a message is received and the message is an authentication message, check whether a verification value is included in the authentication message, and if the verification value is included, send an authentication message legitimacy determination request signal further including the verification value to the source checking server, receive result information responding to the request signal from the source checking server, and process the authentication message based on the result information, and wherein the source checking server is configured to, when the authentication message legitimacy determination request signal is received, search the business information DB for information about a service server unit corresponding to the origination identification information, transmit a source inquiry request signal including the verification value to the service server unit having the origination identification information, receive source authentication results from the service server unit in response to the request signal, and transmit corresponding result information to the mobile communication terminal.

The verification value may be one of a random value, a hash value, and an electronic signature.

The message sending server may be configured to generate a timestamp of the authentication message to be sent, store the timestamp so that the timestamp is mapped to the verification value, send the authentication message with the timestamp further included in the authentication message, further detect the timestamp from the source inquiry request signal, and then perform source authentication.

The source checking server may further include a legitimate business information DB for storing business information about legitimate businesses, and the source checking server may further include a registration means provision unit for providing source registration means when a source registration request is received from a terminal of a manager of a business that operates a service server unit for sending an authentication message; a registration information determination unit for, when the source registration request is received, comparing registration information input through the source registration means with pieces of business information stored in the legitimate business information DB, and then determining whether the business that sent the registration request is a legitimate business; and a registration approval unit for, if it is determined by the registration information determination unit that the business that sent the registration request is the legitimate business, storing and registering information about the business that sent the registration request in the source DB.

The source checking server may further include a source DB for storing, for legitimate sources that send authentication messages including origination identification information, source information including the origination identification information, thus registering legitimate sources, and the source checking server is configured to, when the authentication message legitimacy determination request signal is received, check whether origination identification information included in the authentication message legitimacy determination request signal is registered in the source DB, and then determining whether the source that sent the authentication message is a legitimate source.

A method for checking a legitimate authentication message according to a first embodiment of the present invention to accomplish the above object includes a source checking request operation of allowing a mobile communication terminal to hook and store an authentication message when the authentication message is received, detect origination identification information and a verification value from the hooked authentication message, and transmit an authentication message legitimacy determination request signal including the detected origination identification information and verification value to a source checking server; a source checking operation of, when the authentication message legitimacy determination request signal is received, allowing the source checking server to determine whether a source that sent the authentication message is a legal source, based on origination identification information included in the received signal; and a message processing operation of allowing the mobile communication terminal to receive the result information and process the authentication message depending on the result information.

The source checking request operation may include monitoring whether a message has been received; hooking the message when the message is received during the monitoring; determining whether the message is an authentication message by analyzing the hooked message; if the received message is the authentication message, detecting origination identification information included in the authentication message; and generating an authentication message legitimacy determination request signal including the origination identification information, and transmitting the authentication message legitimacy determination request signal to the source checking server.

The message processing operation may include determining whether the result information is result information for legitimate source authentication or result information for a source authentication failure; and if it is determined that source authentication has succeeded, providing notification that the hooked and stored authentication message has been received.

The message processing operation may further include, if it is determined that the result information is the result information for the source authentication failure, deleting the hooked and stored authentication message.

The source checking operation may include, when an authentication message legitimacy determination request signal is received, allowing the source checking server to detect the origination identification information; checking whether the detected origination identification information is registered in the source DB, and then determining whether the source is a legitimate source; and providing result information of the determination of the source to the mobile communication terminal.

A legitimate authentication message checking method according to a second embodiment of the present invention to accomplish the above object includes an authentication message sending operation of allowing a message sending server to generate and store an unique verification value for an authentication message to be sent to a user of a mobile communication terminal when an event to send an authentication message to the mobile communication terminal occurs, and to send an authentication message including origination identification information and the verification value to the mobile communication terminal; a source checking request operation of allowing the mobile communication terminal to hook and store the authentication message when the authentication message is received, detect the origination identification information and the verification value from the hooked authentication message, and transmit an authentication message legitimacy determination request signal including the detected origination identification information and verification value to a source checking server; a source inquiry request operation of, when the authentication message legitimacy determination request signal is received, allowing the source checking server to generate a source inquiry request signal including the origination identification information and the verification value included in the received authentication message legitimacy determination request signal, and transmit the source inquiry request signal to a service server unit; a source inquiry result information notification operation of allowing the service server unit to compare verification values generated and stored by the message sending server with the verification value included in the source inquiry request signal, determine whether the authentication message is an authentication message sent by the service server unit, and notify the source checking server of result information of the determination; a source checking operation of allowing the source checking server to provide the result information received from the service server unit to the mobile communication terminal; and a message processing operation of allowing the mobile communication terminal to receive the result information and process the authentication message depending on the result information.

The message processing operation may include determining whether the result information is result information for legitimate source authentication or result information for a source authentication failure; and if it is determined that source authentication has succeeded, providing notification that the hooked and stored authentication message has been received.

The message processing operation may further include, if it is determined that the result information is the result information for the source authentication failure, deleting the hooked and stored authentication message.

The verification value may be one of a random value, a hash value, and an electronic signature.

The present invention is advantageous in that it may be determined whether an authentication message received by the mobile communication terminal of a user is a legitimate authentication message sent from a legitimate source, thus preventing a user from suffering pharming and smishing techniques based on SMS messages.

Further, the present invention is advantageous in that it determines whether a source that sent an authentication message is a legitimate source, thus preventing micropayment fraud caused by smishing based on authentication messages.

DETAILED DESCRIPTION OF THE INVENTION

Hereinafter, the configuration and operation of a system for checking a legitimate authentication message according to the present invention will be described and a legitimate authentication message checking method performed by the system will be described.

Figure 1:
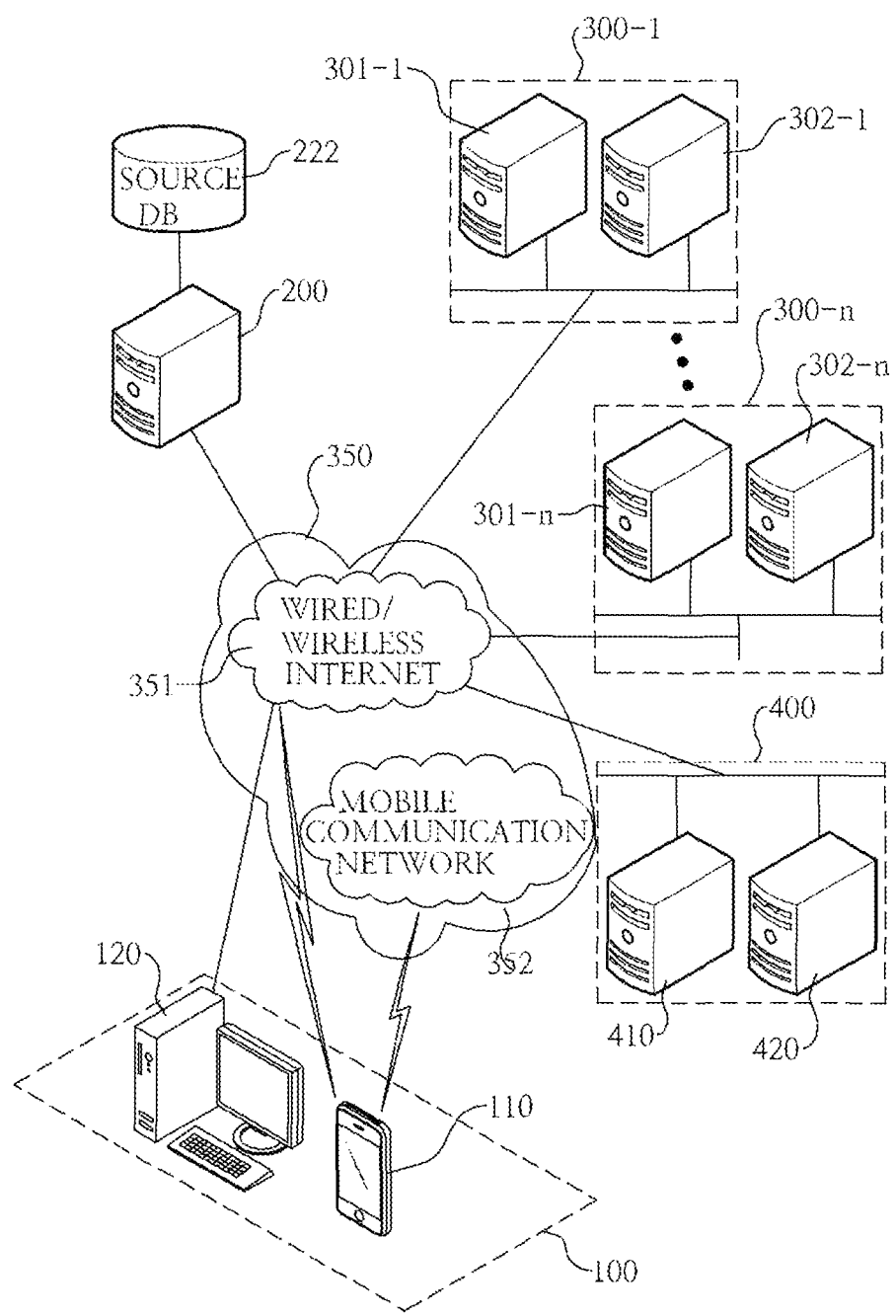
FIG. 1 is a diagram showing the configuration of a communication system to which a system for checking a legitimate authentication message according to the present invention is applied.

FIG. 1 is a diagram showing the configuration of a communication system to which a system for checking a legitimate authentication message according to the present invention is applied.

A system for checking a legitimate authentication message according to a first embodiment of the present invention includes a mobile communication terminal 110 and a source checking server 200. A system for checking a legitimate authentication message according to a second embodiment includes a mobile communication terminal 110, a source checking server 200, and a message sending server 301.

First Embodiment

First, the configuration and operation of the message checking system implemented when an originating number, that is, the origination identification information of the message sending server 301, cannot be changed in a mobile communication network will be described below.

The mobile communication terminal 110 is a terminal such as a Second Generation (2G) or Third Generation (3G) mobile phone, or a 3G or Fourth Generation (4G) smart phone, which is capable of receiving Short Message Service (SMS) messages and performing data communication. The mobile communication terminal 110 is connected to the source checking server 200 through the wired/wireless Internet 351, or to the source checking server 200 through a mobile communication network 352 and the wired/wireless Internet 351, and is configured to receive messages from service server units 300 that provide various services, such as services requiring identity authentication and services related to a free coupon, a mobile gift certificate, and a smart statement through the mobile communication network 352.

When an SMS message is received through the mobile communication network 352, the mobile communication terminal 110 determines whether the received SMS message is an authentication message or a message requiring authentication (hereinafter referred to as an "authentication message"), such as a free coupon message, a smart statement (bill) message, or a mobile gift certificate message, and if it is determined that the message is the authentication message, sends an authentication message legitimacy determination request signal, required to ask if the authentication message is an authentication message sent from a legitimate source, to the source checking server 200.

When the authentication message is an authentication message based on a pharming technique, the mobile communication terminal 110 determines whether the received message is an authentication message, and if it is determined that the message is the authentication message, sends an authentication message legitimacy determination request signal, required to ask if the authentication message is an authentication message sent from a legitimate source, to the source checking server 200.

The authentication message legitimacy determination request signal includes origination identification information included in the authentication message. The origination identification information may be the phone number or the like of a source that sent the authentication message.

When result information is received from the source checking server 200 in response to the authentication message legitimacy determination request signal, the mobile communication terminal 110 displays the authentication message in response to the result information, or deletes the authentication message and displays a message indicating that an authentication message caused by pharming or smishing has been received and deleted. The deletion of the authentication message caused by pharming or smishing may also be performed to delete the corresponding message under the approval of the user.

The source checking server 200 includes a source DB 222 for storing source information about sources that legitimately send authentication messages based on identity authentication, and authentication messages based on free coupon, smart statement, and mobile gift certificate services. The source checking server 200 is configured to, when an authentication message legitimacy determination request signal is received from any mobile communication terminal 110, detect origination identification information included in the authentication message legitimacy determination request signal, check whether source information corresponding to the origination identification information is registered in the source DB 222, and provide result information depending on whether the source information has been registered to the mobile communication terminal 110. The source information may include business information having the name, address, etc. of the corresponding business, origination identification information, etc.

Reference numeral 300 shown in the drawing denotes the service server unit of a service provider that provides a service requiring identity authentication.

Each service server unit 300 includes a service server 302 for providing a service requiring identity authentication over a webpage (or "website"), or providing a free coupon service, a smart statement service, or a mobile gift certificate service, and a message sending server 301 for generating authentication messages based on identity authentication and the provision of services, and sending the authentication messages to the corresponding mobile communication terminal 110 through the wired/wireless Internet 351 and the mobile communication network 352.

Reference numeral 400 shown in the drawing denotes a pharming service server unit for providing a pharming website and an identity authentication service or a smishing service over the pharming website, and sending an authentication message depending on the corresponding service. Reference numeral 410 denotes a message sending server for sending a pharming or smishing message based on the corresponding service. Reference numeral 420 denotes a pharming or smishing service server for providing a pharming website or a smishing service. If the message sending server that sent the authentication message is the pharming or smishing message sending server 410, the origination identification information of the pharming or smishing message sending server will not be registered in the source DB 222.

Second Embodiment

Hereinafter, the configuration of the authentication message checking system implemented when an originating number may be forged will be described below.

The message sending server 301 of the service server unit 300 according to the second embodiment of the present invention generates an authentication message including a unique verification value when an authentication message sending request is received from the service server 302, and sends the authentication message to a target mobile communication terminal 110 through the wired/wireless Internet 351 and the mobile communication network 352.

More specifically, the message sending server 301 according to the second embodiment of the present invention generates an authentication message including origination identification information and a unique verification value, sends the generated message to the mobile communication terminal 110, and stores termination identification information (phone number of the mobile communication terminal) and a verification value for the sent authentication message. The authentication message may further include a timestamp and the Uniform Resource Locator (URL) of a website provided by the service server 302. If the timestamp is included, it may be stored so that the timestamp is mapped to the verification value. The verification value may be a random value, a hash value, or an electronic signature.

Further, upon receiving an authentication message legitimacy determination request signal, the message sending server 301 determines whether a verification value included in the received authentication message legitimacy determination request signal is the verification value generated by the message sending server 301, and provides the result information of the determination to the source checking server 200.

The mobile communication terminal 110 generates an authentication message legitimacy determination request signal including the origination identification information and the verification value included in the received authentication message, and transmits the generated signal to the source checking server 200.

When the authentication message legitimacy determination request signal is received from the mobile communication terminal 110, the source checking server 200 transmits a source inquiry request signal including the verification value to the message sending server 301 of the service server unit 300 having the origination identification information included in the authentication message legitimacy determination request signal, receives result information in response to the request signal, and provides the result information to the corresponding mobile communication terminal 110.

Figure 2:
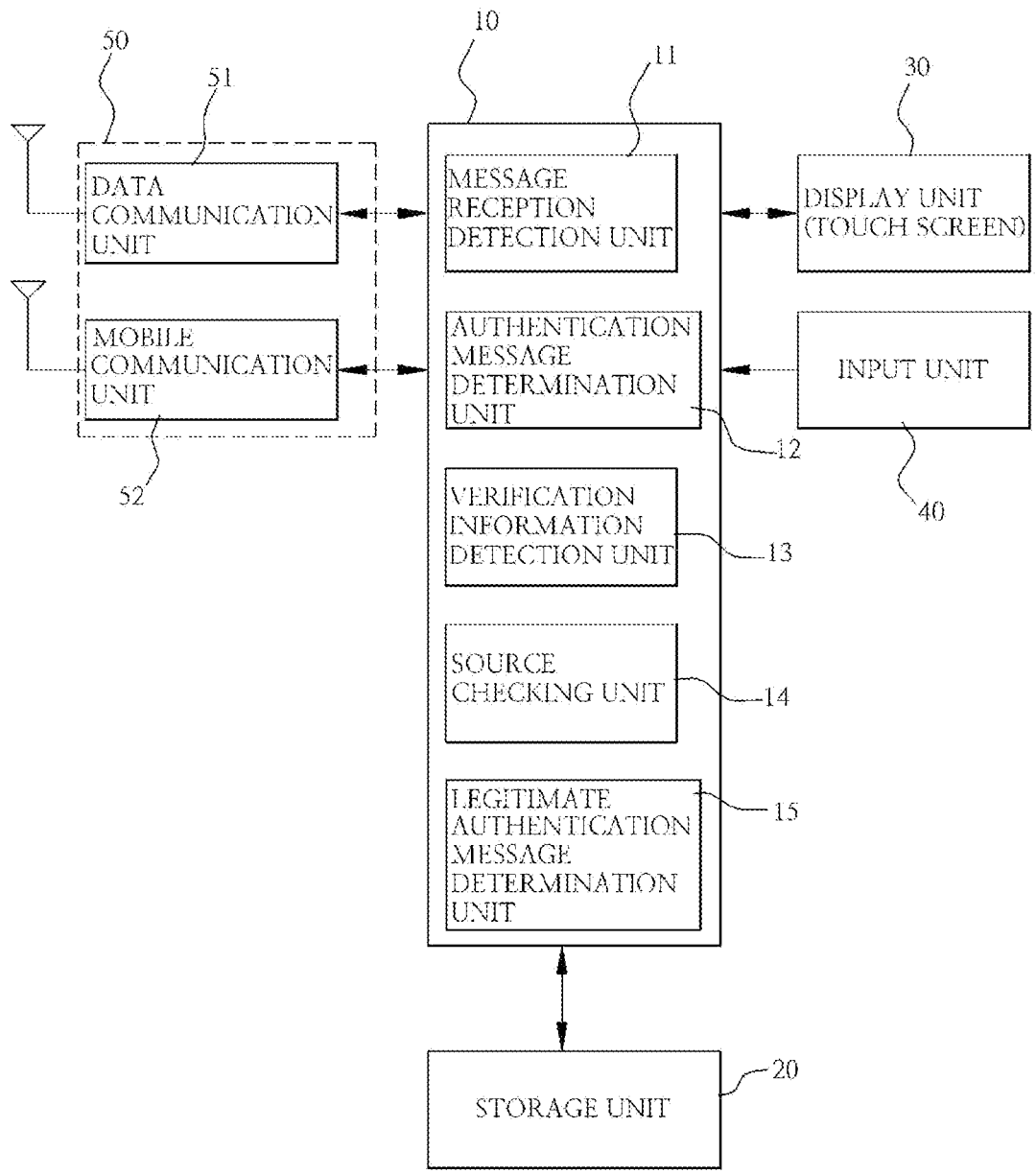
FIG. 2 is a diagram showing the configuration of the mobile communication terminal of the legitimate authentication message checking system according to the present invention.

FIG. 2 is a diagram showing the configuration of the mobile communication terminal of the legitimate authentication message checking system according to an embodiment of the present invention. Below, the configuration and operation of the mobile communication terminal according to the present invention will be described in detail.

The mobile communication terminal 110 according to the present invention includes a control unit 10, a storage unit 20, a display unit 30, an input unit 40, and a communication unit 50.

The storage unit 20 includes a program area for storing a control program or an operating system program and an application program according to the present invention, a temporary area for temporarily storing data generated during the execution of the program, and a data area for storing data generated by a user.

The display unit 30 may be a Liquid Crystal Display (LCD) or a touch screen display, and is configured to display various types of operating status information of the mobile communication terminal 110 and display text, images, videos, etc. under the control of the control unit 10. When the display unit 30 is a touch screen, a soft keypad or the like enabling the selection of data and programs and the input of characters and numerals via a touch on the screen is displayed, and coordinate data corresponding to the touched location is output to the control unit 10.

The input unit 40 is composed of keys on a keypad enabling the input of characters and numerals, or a small number of buttons such as a simple home button and a power button, and outputs a signal corresponding to a pressed key or button to the control unit 10.

The communication unit 50 includes a data communication unit 51 for accessing the wired/wireless Internet 351 of the wired/wireless data communication network 350 and performing data communication with systems such as the source checking server 200 and the service server 320 connected to the wired/wireless Internet 351; and a mobile communication unit 52 for performing voice communication with other mobile communication terminals 110 through the mobile communication network 352, or for accessing the wired/wireless Internet 351 through the mobile communication network 252 and performing data communication with other systems connected to the wired/wireless Internet 351.

The control unit 10 controls the overall operation of the mobile communication terminal 110 according to the present invention depending on a program stored in the storage unit 20.

In particular, in accordance with the present invention, the control unit 10 includes a message reception detection unit 11, an authentication message determination unit 12, a verification information detection unit 13, a source checking unit 14, and a legitimate authentication message determination unit 15, and is configured to determine whether the source of a received authentication message is a legitimate source, and if it is determined that the source of the received authentication message is legitimate, display the authentication message on the display unit 30, whereas if it is determined that the authentication message is not legitimate, display information indicating that the authentication message is a pharming message or a smishing message on the display unit 30 and then delete the authentication message.

More specifically, the message reception detection unit 11 monitors whether an SMS message has been received through the mobile communication network 352, and if the SMS message is received, hooks the SMS message, stores the SMS message in the temporary area or the data area of the storage unit 20 without displaying the SMS message on the display unit 30, and provides it to the authentication message determination unit 12.

The authentication message determination unit 12 determines whether an SMS message has been received, via the message reception detection unit 11, analyzes the content of the SMS message, determines whether the SMS message is a normal authentication message, or an authentication message requiring authentication, such as a free coupon message, a smart statement message, or a mobile gift certificate message, and provides the SMS message to the verification information detection unit 13 if the SMS message is the authentication message.

The verification information detection unit 13 is configured to, if it is determined by the authentication message determination unit 12 that the SMS message is the authentication message, detect origination identification information included in the SMS message, and provide the origination identification information to the source checking unit 14 according to a first embodiment of the present invention, and detect origination identification information and a verification value and provide them to the source checking unit 14 according to a second embodiment. The origination identification information may preferably be an originating number. In addition, the verification information detection unit 13 may be configured to further detect termination identification information.

The source checking unit 14 is configured to, when verification information is input from the verification information detection unit 13, generate an authentication message legitimacy determination request signal including the verification information and transmit the generated signal to the source checking server 200, and if result information is received from the source checking server 200 in response to the request signal, provide the result information to the legitimate authentication message determination unit 15.

If the result information is received, the legitimate authentication message determination unit 15 processes the received authentication message depending on the result information. That is, if the authentication message has been sent from a legitimate source, the legitimate authentication message determination unit 15 displays information, indicating whether the authentication message has been received, on the display unit 30, whereas if the authentication message has been sent from an illegitimate source, deletes the authentication message. The legitimate authentication message determination unit 15 may be configured to display a message, indicating whether the authentication message has been received and indicting that the authentication message has been sent from an illegitimate source, on the display unit 30, and then delete the message.

Figure 3:
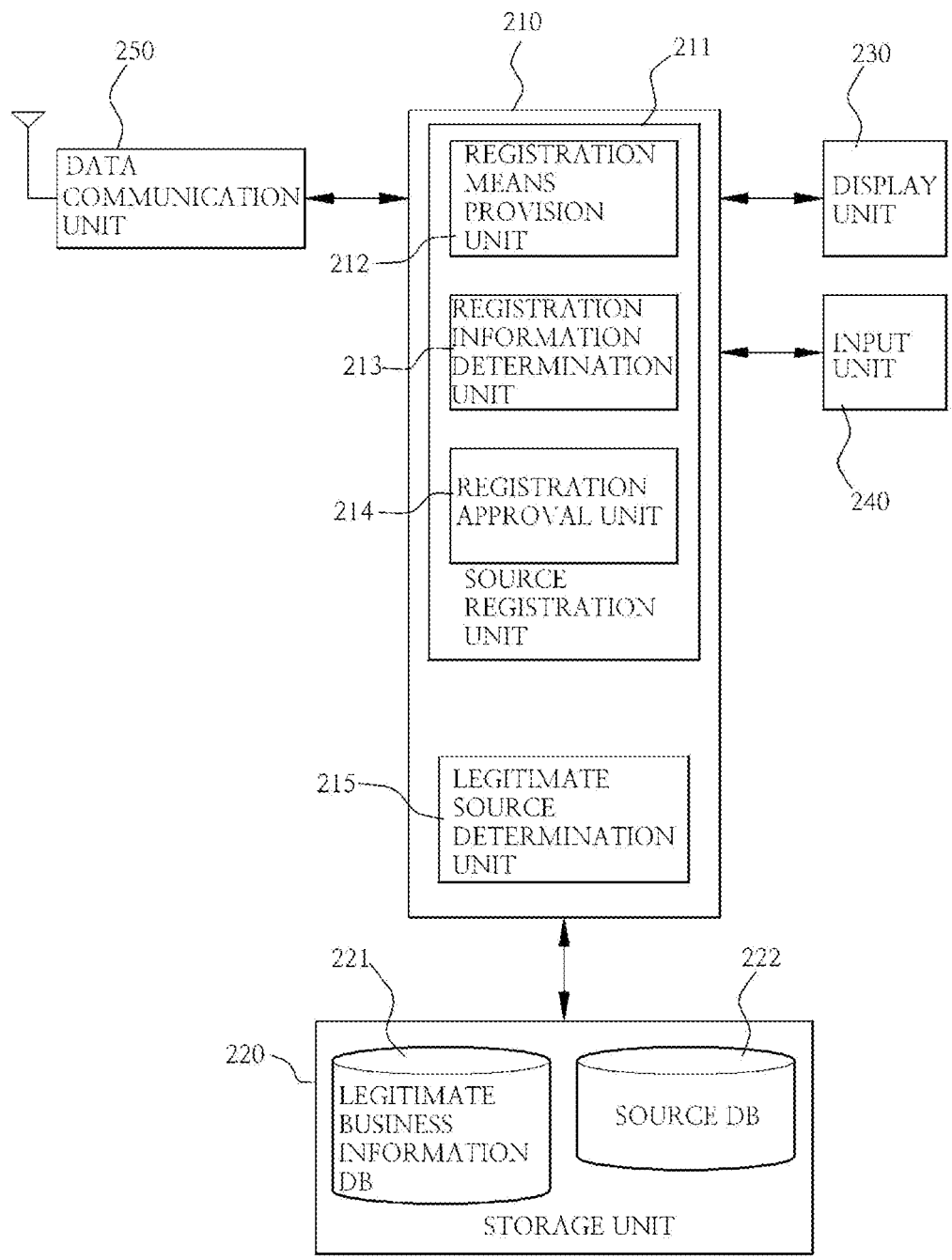
FIG. 3 is a diagram showing the configuration of the source checking server of the legitimate authentication message checking system according to a first embodiment of the present invention.

FIG. 3 is a diagram showing the configuration of the source checking server of the legitimate authentication message checking system according to a first embodiment of the present invention. Below, the configuration and operation of the source checking server 200 according to the present invention will be described with reference to FIG. 3.

The source checking server 200 according to the first embodiment includes a control unit 210, a storage unit 220, a display unit 230, an input unit 240, and a data communication unit 250.

The storage unit 220 includes a program area for storing a control program required to control the operation of the present invention; a temporary area for temporarily storing data generated during the execution of the program; and a data area for storing a legitimate business information DB 221 and a source DB 222, wherein the legitimate business information DB 221 stores information about legitimate businesses and the source DB 222 stores pieces of source information including the origination identification information of businesses that legitimately send authentication messages.

The display unit 230 displays the operating status of the control unit 210 and various types of information.

The input unit 240 may be a keyboard or the like, and outputs a key signal corresponding to a pressed key to the control unit 10.

The data communication unit 250 accesses the wired/wireless Internet 351 to perform data communication with other systems and devices connected to the wired/wireless Internet 351.

The control unit 210 includes a source registration unit 211 for receiving information about businesses that legitimately authenticate the identity of each user and that send authentication messages based on identity authentication, and businesses that legitimately send messages requiring authentication, such as free coupons, smart statements (bill) and mobile gift certificates, and registering the business information as legitimate sources in the source DB 222; and a legitimate source determination unit 215 for, when an authentication message legitimacy determination request signal is received from the mobile communication terminal 110, determining whether a legitimate source having origination identification information included in the authentication message legitimacy determination request signal is registered in the source DB 222, determining the legitimacy of the source having the origination identification information, and providing the result information of the determination to the mobile communication terminal 110.

The source registration unit 211 includes a registration means provision unit 212, a registration information determination unit 213, and a registration approval unit 214.

The registration means provision unit 212 is configured to, when a business manager desiring to register as a legitimate authentication message sending source accesses the server via a manager terminal (not shown) and requests the registration of a source, provide a source registration means to the manager terminal, and receive registration information. The registration information includes business information such as the name and address of each business and the number of employees in the business, the business registration certificate of the business, and appended papers of the business such as data that is the basis of determination of the sales status of the business.

The registration information determination unit 213 determines whether each registered business is a business registered in the legitimate business information DB 221, based on the registration information, and provides the results of determination to the registration approval unit 214.

The registration approval unit 214 registers the registration information of the corresponding business in the source DB 222 depending on the result information of the registration information determination unit 213. Further, when a business that has requested registration as a legitimate source is not present in the legitimate source information DB 221, or when the information is different from the registered information, the registration approval unit 214 may be configured to request the approval of a manager for a given registration event, notify the manager of the registration event when the manager accesses the server via the manager terminal, obtain approval for the event, and register as a legitimate source. This is intended to thoroughly manage legitimate sources.

Figure 4:
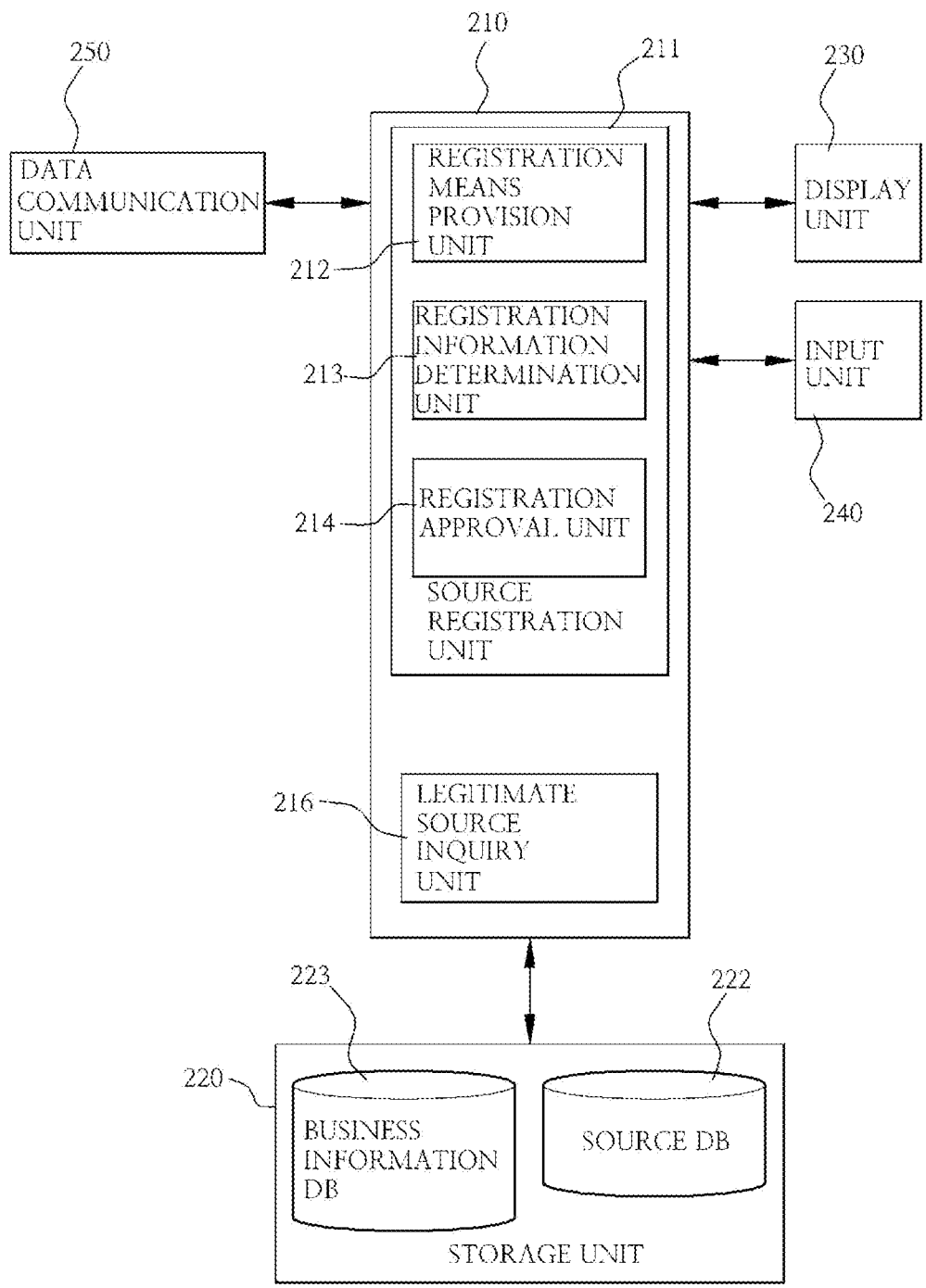
FIG. 4 is a diagram showing the configuration of the source checking server of the legitimate authentication message checking system according to a second embodiment of the present invention.

FIG. 4 is a diagram showing the configuration of the source checking server of the legitimate authentication message checking system according to a second embodiment of the present invention.

The control unit 210 of the source checking server 200 according to the second embodiment of the present invention includes a legitimate source inquiry unit 216 instead of the legitimate source determination unit 215 in the first embodiment, and the storage unit 220 includes a business information DB 233 instead of the legitimate business information DB 221 in the first embodiment.

The business information DB 223 stores business information including pieces of origination identification information and the information of message sending servers corresponding to the respective pieces of origination identification information. The message sending server information may be one or more of a URL and Internet Protocol (IP) information.

When an authentication message legitimacy determination request signal is received from the mobile communication terminal 110, the legitimate source inquiry unit 216 detects origination identification information and a verification value included in the authentication message legitimacy determination request signal, searches for the information of a message sending server 301 corresponding to a source having the origination identification information, transmits a source inquiry request signal including the termination identification information and verification value of the mobile communication terminal 110 to the corresponding message sending server 301, receives source authentication result information from the message sending server 301 in response to the source inquiry request signal, and provides the source authentication result information to the mobile communication terminal 110.

Figure 5:
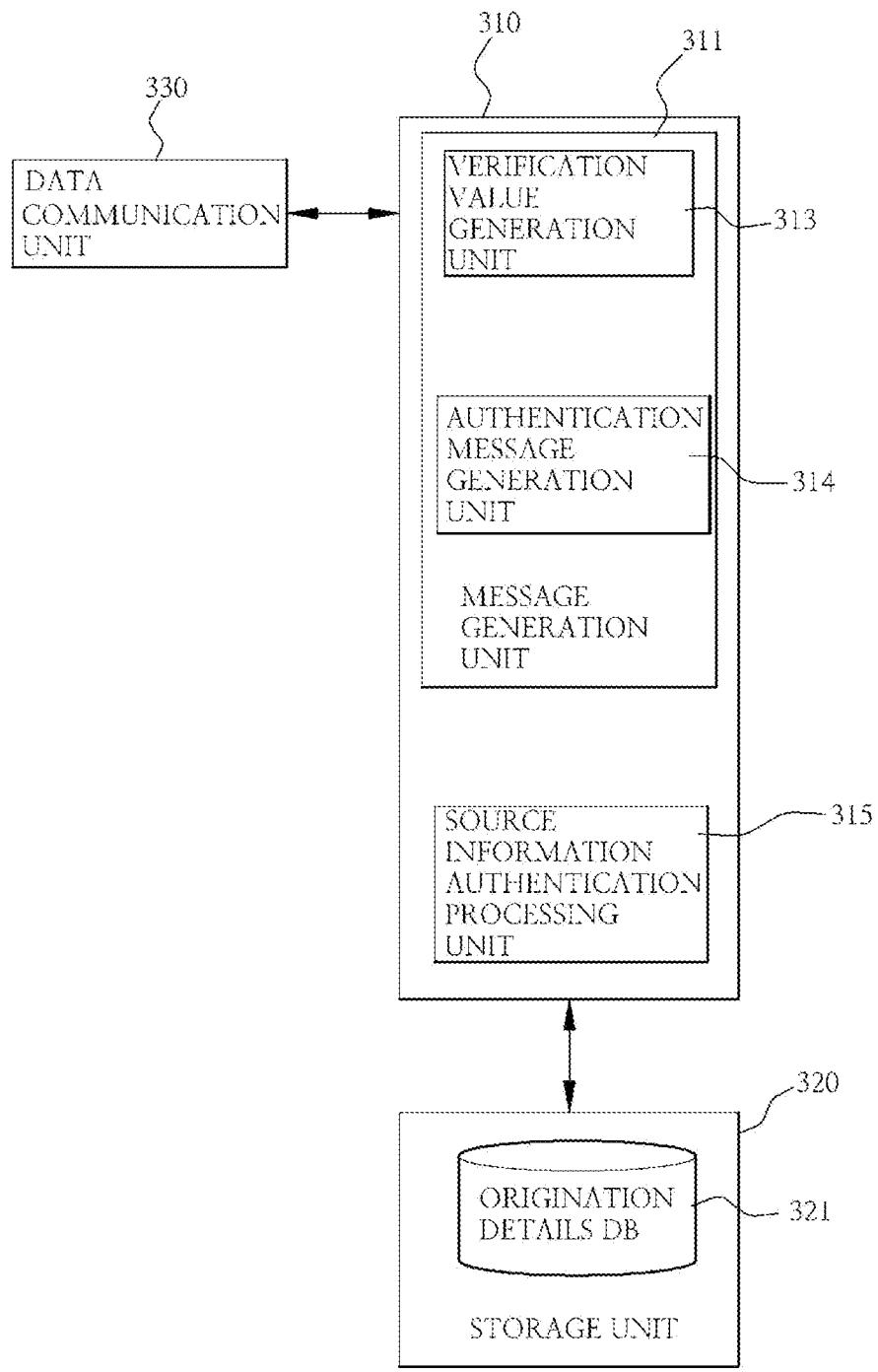
FIG. 5 is a diagram showing the configuration of the message sending server of the service server unit according to a second embodiment of the present invention.

FIG. 5 is a diagram showing the configuration of the message sending server of the service server unit according to a second embodiment of the present invention.

Referring to FIG. 5, the message sending server 301 of the service server unit 300 according to the second embodiment of the present invention includes a control unit 310, a storage unit 320, and a data communication unit 330.

In accordance with the second embodiment of the present invention, the storage unit 320 includes an origination details DB for storing origination details including the verification value of an authentication message sent to the mobile communication terminal 110 and the termination identification information of the mobile communication terminal 110 that sent the authentication message. The origination details DB 321 may further store the message ID and timestamp of each authentication message.

The data communication unit 330 accesses the wired/wireless Internet 351 to perform data communication with the source checking server 200, receives an SMS message that is the authentication message from the control unit 310 to be sent to the mobile communication terminal 110 through the wired/wireless Internet 351 and the mobile communication network 352, and sends the SMS message.

The control unit 310 includes a message generation unit 311 for generating an authentication message according to a second embodiment of the present invention and sending the authentication message to the mobile communication terminal 110 through the data communication unit 330; and a source information authentication processing unit 315 for determining whether an authentication message having termination identification information and a verification value, included in a source inquiry request signal, is a message sent by the control unit 310, with reference to the origination details DB 321 upon receiving the source inquiry request signal, and providing the results of the source authentication to the source checking server 200.

The message generation unit 311 includes a verification value generation unit 313 for generating a unique verification value corresponding to an authentication message to be sent; and an authentication message generation unit 314 for generating an authentication message that is an SMS message including the details of the message, the verification value, and the termination identification information of a mobile communication terminal which will receive the authentication message. The verification value may be a random value that has been uniquely and randomly generated for each message sending server 301, or a hash value, or an electronic signature. Further, the authentication message may include a timestamp.

Figure 6:
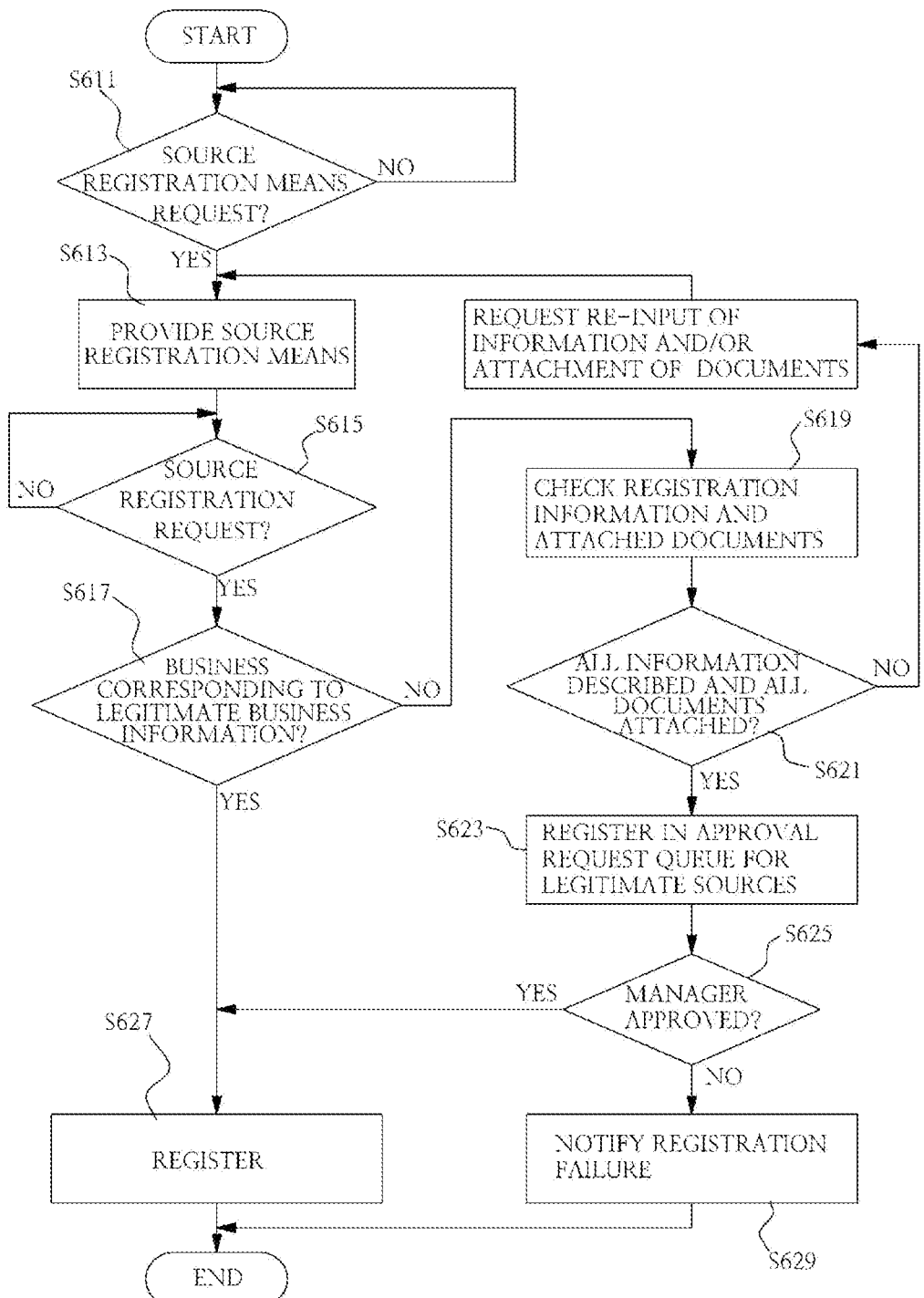
FIG. 6 is a flowchart showing a legitimate source registration method performed by the legitimate authentication message checking system according to a first embodiment of the present invention.

FIG. 6 is a flowchart showing a legitimate source registration method performed by the legitimate authentication message checking system according to a first embodiment of the present invention. Below, a legitimate source registration method according to a first embodiment will be described in detail with reference to FIGS. 3 to 6.

First, the registration means provision unit 212 of the source registration unit 211 provides an access means to the manager terminal of a business that desires to register as an authentication message source that sends authentication messages based on a service in the form of a webpage, a mobile page, or an exclusive business application, and checks whether a source registration means request is received from the manager terminal via the access means (S611).

If the source registration means request is received, the registration means provision unit 212 provides a source registration means enabling documents capable of proving business information, business evidence, and business soundness to be attached as images or the like (S613).

After the provision of the source registration means, the registration means provision unit 212 checks whether a source registration request has been received (S615). If a source registration request has been received, the registration means provision unit 212 stores the corresponding source registration information in the storage unit 220, and notifies the registration information determination unit 213 that source registration information based on the source registration request has been stored.

Then, the registration information determination unit 213 determines whether a business corresponding to the source registration information is a business registered in the legitimate business information DB, based on the source registration information stored in the storage unit 220 (S617).

If it is determined that the business is a business stored in the legitimate business information DB, the registration approval unit 214 stores the stored source registration information in the source DB 222 and registers the business as a legitimate source (S627).

However, if it is determined that the business corresponding to the source registration information is not a business stored in the legitimate business information DB, the registration information determination unit 213 checks the documents attached to the registration information (S619), and determines whether all information has been described and all required documents have been attached (S621).

If all of the information and attached documents have been described and attached, the source registration information is registered in an approval request queue for legitimate sources (S623).

When the manager accesses the message sending server 301, the pieces of information registered in the approval request queue for legitimate sources may be reported through a manager terminal by which the manager accesses the message sending server 301. When the manager provides approval, the information in the queue may be displayed.

When the manager approves the legitimate source registration request registered in the queue, the corresponding source is registered as a legitimate source (S627), whereas when the manager rejects the approval, a registration failure message is sent to the manager of the business that requested the registration as a legitimate source. The registration failure message may be sent in the form of an SMS message, email or the like, and may be delivered as a push message when the registration means is configured in the form of an application.

Figure 7:
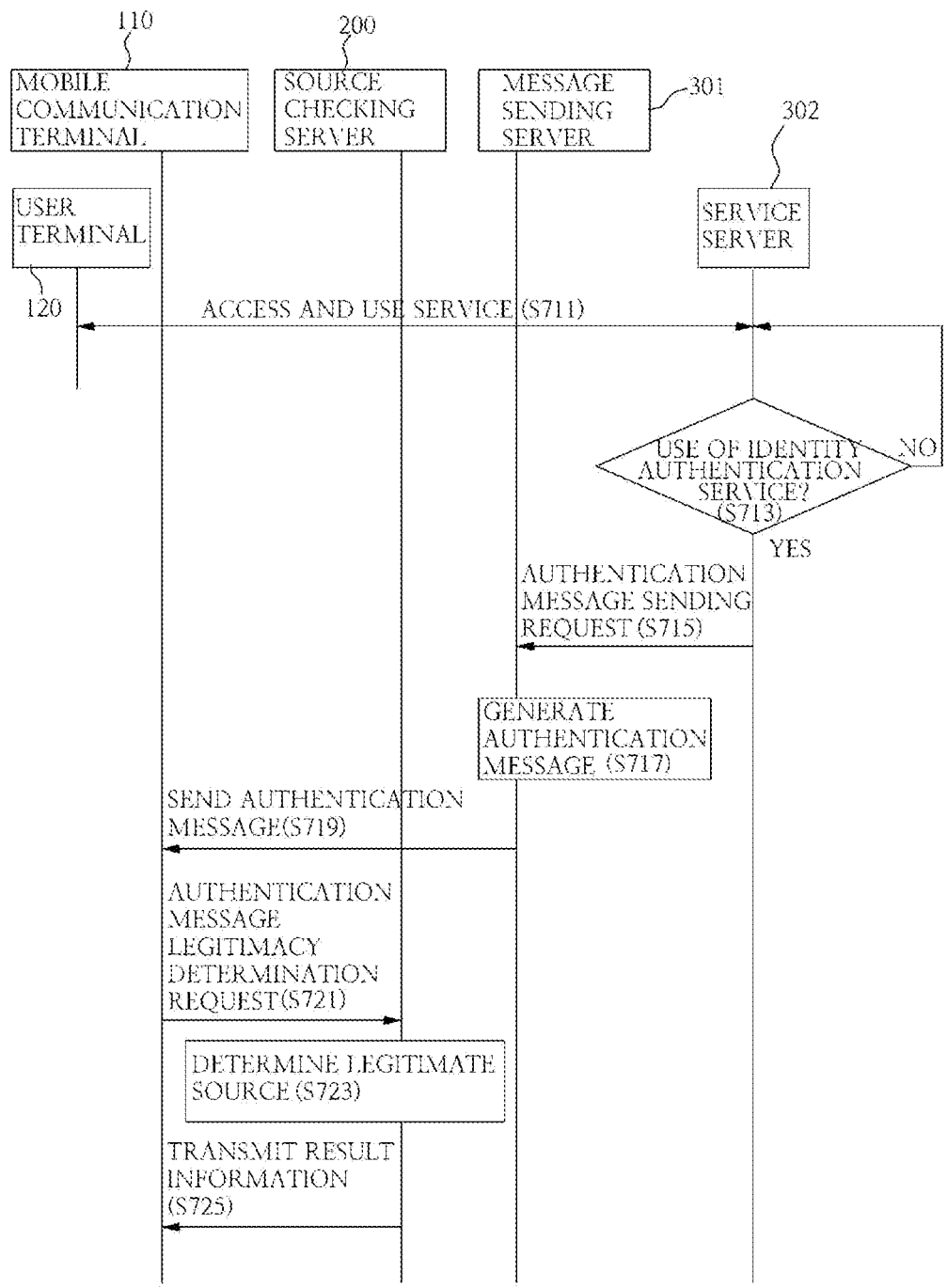
FIG. 7 is a flowchart showing a legitimate authentication message checking method performed by the legitimate authentication message checking system according to a first embodiment of the present invention.

FIG. 7 is a flowchart showing a legitimate authentication message checking method performed by the legitimate authentication message checking system according to a first embodiment of the present invention, and illustrates a method that is applied when hackers operating pharming websites or the like cannot forge the origination identification information of an authentication message.

A user having a mobile communication terminal 110 and a user terminal 120 may access any service server 302 via the user terminal 120 and use the corresponding service (S711).

In this case, the service server 302 checks whether a service requiring the identity authentication of the user has been selected (S713). If an identity authentication service has been selected, the service server 302 receives the phone number of the mobile communication terminal 110, that is, termination identification information, and user identification information via a given identity authentication program, authenticates the identity of the user by means of a mobile communication company server (not shown), and then requests the message sending server 301 to send an authentication message (S715).

When such an authentication message sending request is received, the message sending server 301 generates an authentication message including an authentication number (S717), and sends the authentication message to the mobile communication terminal 110 over the mobile communication network 352 (S719).

The mobile communication terminal 110 that received the authentication message generates an authentication message legitimacy determination request signal including origination identification information, that is, the phone number of the message sending server, from the authentication message, and transmits the authentication message legitimacy determination request signal to the source checking server 200 (S721).

Next, the source checking server 200 detects the origination identification information included in the authentication message legitimacy determination request signal, checks whether a business corresponding to the origination identification information is registered as a legitimate source in the source DB 222, and then determines whether the authentication message has been sent from a legitimate source (S723).

If it is determined that the source of the authentication message is a legitimate source, the source checking server 200 transmits the result information of the determination to the mobile communication terminal 110 (S725).

In FIG. 7, although a description has been made only for the pharming technique, an authentication message such as a free coupon, a smart statement, or a mobile gift certificate may be generated at step S717 and a subsequent procedure may be implemented in the same manner even for a swishing technique.

Figure 8:
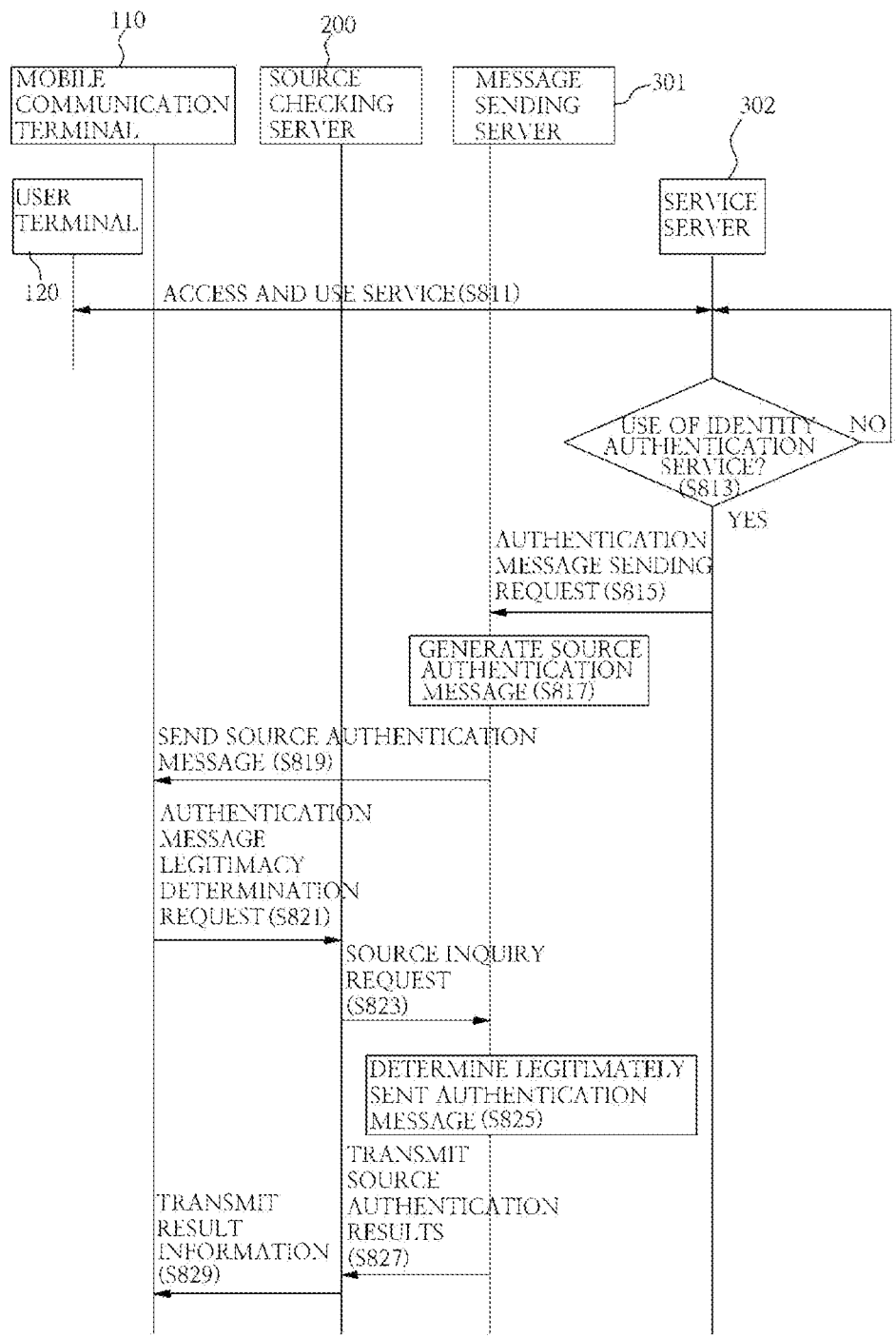
FIG. 8 is a flowchart showing a legitimate authentication message checking method performed by the legitimate authentication message checking system according to a second embodiment of the present invention.

FIG. 8 is a flowchart showing a legitimate authentication message checking method performed by the legitimate authentication message checking system according to a second embodiment of the present invention, and is a flow diagram illustrating a legitimate authentication message checking method applied to a case where origination identification information, that is, an originating phone number, may be changed to any number.

Referring to FIG. 8, similar to FIG. 7, if the use of an identity authentication service is detected (S813), the service server 302 sends an authentication message sending request signal to the message sending server 301 (S815).

In this case, the message sending server 301 generates an authentication message including origination identification information and a verification value (S817), and sends the authentication message to the mobile communication terminal 110 (S819).

The mobile communication terminal 110 that received the authentication message detects the origination identification information and the verification value from the authentication message, generates an authentication message legitimacy determination request signal including the detected origination identification information and verification value, and transmits the generated signal to the source checking server 200 (S821).

The source checking server 200 that received the authentication message legitimacy determination request signal detects the origination identification information, and searches the business information DB 223 for information about the message sending server 301 of a business corresponding to the detected origination identification information, and transmits a source inquiry request signal including the termination identification information and the verification value of the mobile communication terminal 110 to the message sending server 301 corresponding to the found information (S823). The source inquiry request signal may include only the verification value.

When the source inquiry request signal is received from the source checking server 200, the message sending server 301 detects either the verification value or the reception identification value and the verification value, included in the source inquiry request signal, and determines whether the authentication message having the verification value is the message sent by the message sending server 301, based on one or more of the termination identification information and the verification value and the origination details information stored in the origination details DB 321, thus determining whether the authentication message is a legitimately sent message (S825).

Once such determination has been performed, the message sending server 301 sends result information for source authentication to the source checking server 200 (S827).

Then, the source checking server 200 transmits result information corresponding to the received source authentication result information to the mobile communication terminal 110 (S829).

Figure 9:
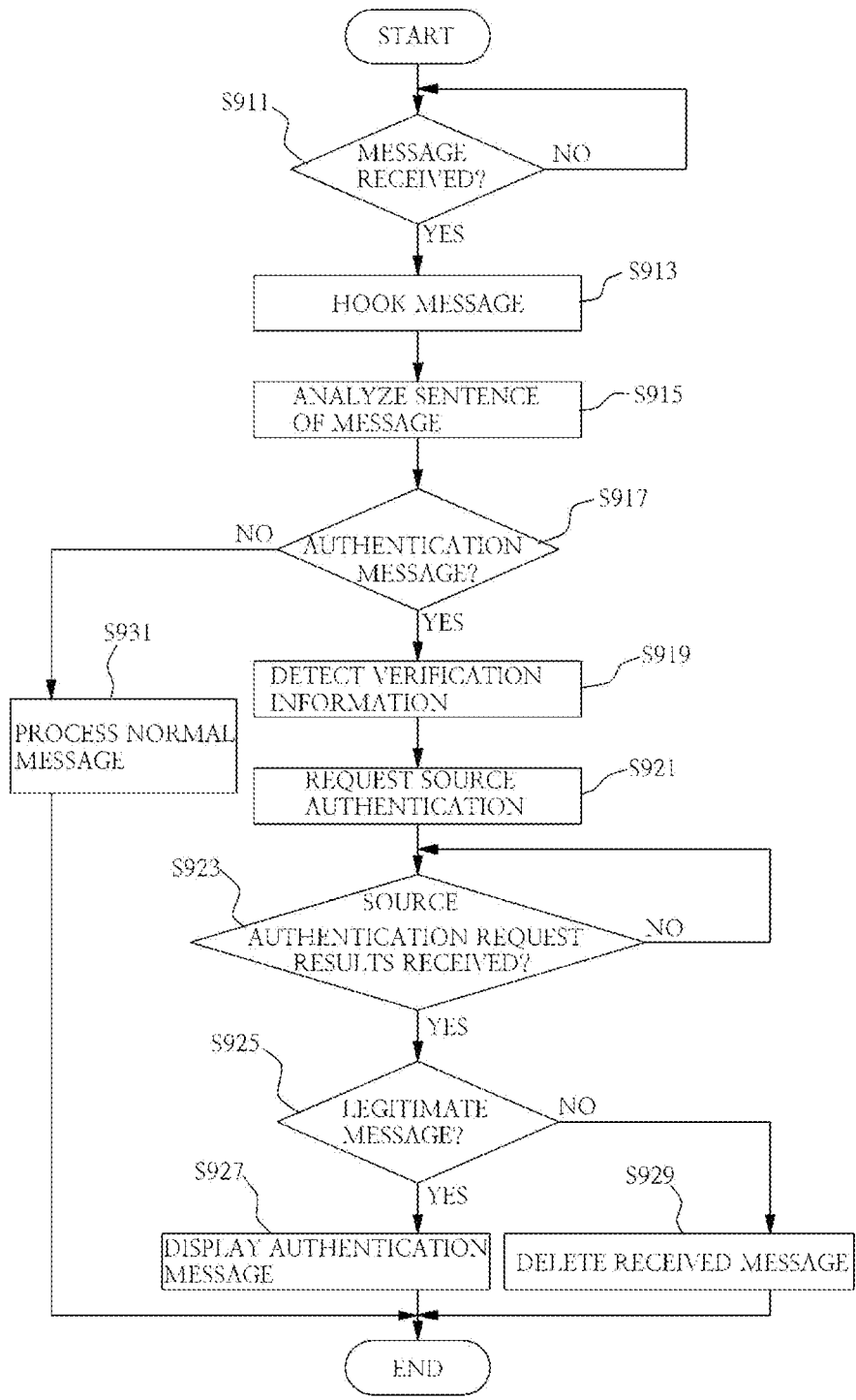
FIG. 9 is a flowchart showing a legitimate authentication message checking method performed by the mobile communication terminal of the legitimate authentication message checking system according to an embodiment of the present invention.

FIG. 9 is a flowchart showing a legitimate authentication message checking method performed by the mobile communication terminal of the legitimate authentication message checking system according to an embodiment of the present invention. Below, the operation of the mobile communication terminal according to the first and second embodiments of the present invention will be described with reference to FIGS. 2 and 9.

First, the message reception detection unit 11 of the control unit 10 checks whether an SMS message has been received via the mobile communication unit 52 (S911).

If the SMS message has been received, the message reception detection unit 11 hooks the SMS message and stores the hooked message in the storage unit 20 (S913). Typically, the control unit 10 of the mobile communication terminal 110 indicates the reception of a message in terms of sound, vibration, and display upon receiving the message. However, in the present invention, the message reception detection unit 11 hooks the received message, and does not notify the user of the reception of the message even if the message has been received.

If the message is hooked, the authentication message determination unit 12 analyzes the sentence of the hooked and stored message (S915), and determines whether the received SMS message is an authentication message (S917).

If it is determined that the SMS message is not an authentication message, the authentication message determination unit 12 performs normal message processing of notifying the user that the message has been received in terms of one or more of sound, vibration, and display (S931).

In contrast, if it is determined that the received SMS message is the authentication message, the verification information detection unit 13 detects verification information from the authentication message (S919). The verification information may be the origination identification information, that is, the originating telephone number of the message sending server 301 according to the first embodiment, and may also be the originating telephone number and the verification value of the message sending server 301 according to the second embodiment.

Once the verification information has been detected, the source checking unit 14 requests the authentication of a source by transmitting an authentication message legitimacy determination request signal including the verification information to the source checking server 200 (S921). However, in the case of the second embodiment, the source checking unit 14 may preferably be configured to, if a verification value is not included in the authentication message, immediately consider that the authentication message has been sent from an illegitimate source.

After the authentication message legitimacy determination request signal has been transmitted, the source checking unit 14 checks whether result information for the source authentication request has been received (S923), and if the result information for the source authentication request has been received, provides the result information to the legitimate authentication message determination unit 15 (S923).

The legitimate authentication message determination unit 15 that received the result information for the source authentication request determines whether the received authentication message is a legitimate message (S925). If it is determined that the authentication message is the legitimate message, the legitimate authentication message determination unit 15 notifies the user that the SMS message has been received in terms of vibration, sound and display (S927), whereas if it is determined that the authentication message is not a legitimate message, deletes the authentication message (S929).

For such an illegitimate message, the legitimate authentication message determination unit 15 may be configured to display a message indicating that an illegitimate authentication message has been received, and delete the illegitimate authentication message only when the user desires to delete the illegitimate authentication message.

Meanwhile, those skilled in the art will appreciate that the present invention is not limited to the above-described typical embodiments, and that various improvements, modifications, substitutions or additions are possible, without departing from the scope and spirit of the invention as disclosed in the accompanying claims. It should be understood that as long as the implementation of improvements, modifications, substitutions or additions falls within the scope of the accompanying claims, the spirit thereof belongs to the scope of the present invention.

The invention claimed is:

1. A system for checking a legitimate authentication message, comprising:
   a source checking server for, when an authentication message legitimacy determination request signal including origination identification information is received, determining whether a source that sent an authentication message causing the authentication message legitimacy determination request signal is a legitimate source, based on the origination identification information included in the received signal, and providing notification of results of the determination; and
   a mobile communication terminal for, when a message is received, analyzing the message, determining whether the message is an authentication message, detecting origination identification information when the message is the authentication message, transmitting the authentication message legitimacy determination request signal including the origination identification information to the source checking server, and processing the authentication message based on result information when the result information is received from the source checking server in response to the authentication message legitimacy determination request signal,
   wherein the system further comprises:
   a message sending server for, when an event to send an authentication message to the mobile communication terminal occurs, generating and storing a unique verification value for an authentication message to be sent, and sending an authentication message including origination identification information and the verification value to the mobile communication terminal; and
   a service server unit including a service server for, when a source inquiry request signal is received, comparing a verification value included in the received source inquiry request signal with stored verification values, determining whether the verification value is a verification value generated by the service server, and transmitting source authentication results including result information of the determination to the source checking server,
   wherein the source checking server comprises a business information database (DB) for storing pieces of origination identification information and information of service server units corresponding to the respective pieces of origination identification information, and
   wherein the mobile communication terminal is configured to, when a message is received and the message is an authentication message, check whether a verification value is included in the authentication message, and when the verification value is included, send an authentication message legitimacy determination request signal further including the verification value to the source checking server, receive result information responding to the request signal from the source checking server, and process the authentication message based on the result information, and
   wherein the source checking server is configured to, when the authentication message legitimacy determination request signal is received, search the business information DB for information about a service server unit corresponding to the origination identification information, transmit a source inquiry request signal including the verification value to the service server unit having the origination identification information, receive source authentication results from the service server unit in response to the request signal, and transmit corresponding result information to the mobile communication terminal.

2. The system of claim 1, wherein:
   the mobile communication terminal comprises:
   a communication unit for receiving the message through a mobile communication network and performing data communication with the source checking server through a wired/wireless Internet; and
   a control unit for receiving the message via the communication unit, determining whether the message is an authentication message, accessing the source checking server via the communication unit, and performing source authentication on a source that sent the authentication message, and
   wherein the control unit comprises:
   a message reception detection unit for monitoring whether a message has been received through the mobile communication network, and hooking a received message when the message is received;
   an authentication message determination unit for determining whether the received message is an authentication message;
   a verification information detection unit for, when the received message is the authentication message, detecting origination identification information;
   a source checking unit for transmitting an authentication message legitimacy determination request signal including the origination identification information to the source checking server, and receiving result information from the source checking server; and
   a legitimate authentication message determination unit for, when the result information is received, and the result information indicates that the received authentication message has been sent from a legitimate source, providing notification of reception of the hooked message.

3. The system of claim 2, wherein the legitimate authentication message determination unit is configured to, when the result information indicates that the authentication message is not sent from a legitimate source, delete the hooked message.

4. The system of claim 1, wherein the verification value is one of a random value, a hash value, and an electronic signature.

5. The system of claim 1, wherein the message sending server is configured to generate a timestamp of the authentication message to be sent, store the timestamp so that the timestamp is mapped to the verification value, send the authentication message with the timestamp further included in the authentication message, further detect the timestamp from the source inquiry request signal, and then perform source authentication.

6. The system of claim 1, wherein:
   the source checking server further comprises a legitimate business information DB for storing business information about legitimate businesses, and the source checking server further comprises:
a registration means provision unit for providing source registration means when a source registration request is received from a terminal of a manager of a business that operates a service server unit for sending an authentication message;
a registration information determination unit for, when the source registration request is received, comparing registration information input through the source registration means with pieces of business information stored in the legitimate business information DB, and then determining whether the business that sent the registration request is a legitimate business; and
a registration approval unit for, when it is determined by the registration information determination unit that the business that sent the registration request is the legitimate business, storing and registering information about the business that sent the registration request in the source DB.

7. The system of claim 1, wherein:
the source checking server further comprises a source DB for storing, for legitimate sources that send authentication messages including origination identification information, source information including the origination identification information, thus registering legitimate sources, and
the source checking server is configured to, when the authentication message legitimacy determination request signal is received, check whether origination identification information included in the authentication message legitimacy determination request signal is registered in the source DB, and then determining whether the source that sent the authentication message is a legitimate source.

8. A method for checking a legitimate authentication message, comprising:
an authentication message sending operation of allowing a message sending server to generate and store an unique verification value for an authentication message to be sent to a user of a mobile communication terminal when an event to send an authentication message to the mobile communication terminal occurs, and to send an authentication message including origination identification information and the verification value to the mobile communication terminal;
a source checking request operation of allowing the mobile communication terminal to hook and store the authentication message when the authentication message is received, detect the origination identification information and the verification value from the hooked authentication message, and transmit an authentication message legitimacy determination request signal including the detected origination identification information and verification value to a source checking server;
a source inquiry request operation of, when the authentication message legitimacy determination request signal is received, allowing the source checking server to generate a source inquiry request signal including the origination identification information and the verification value included in the received authentication message legitimacy determination request signal, and transmit the source inquiry request signal to a service server unit;
a source inquiry result information notification operation of allowing the service server unit to compare verification values generated and stored by the message sending server with the verification value included in the source inquiry request signal, determine whether the authentication message is an authentication message sent by the service server unit, and notify the source checking server of result information of the determination;
a source checking operation of allowing the source checking server to provide the result information received from the service server unit to the mobile communication terminal; and
a message processing operation of allowing the mobile communication terminal to receive the result information and process the authentication message depending on the result information.

9. The method of claim 8, wherein the message processing operation comprises:
determining whether the result information is result information for legitimate source authentication or result information for a source authentication failure; and
when it is determined that source authentication has succeeded, providing notification that the hooked and stored authentication message has been received.

10. The method of claim 8, wherein the message processing operation further comprises, when it is determined that the result information is the result information for the source authentication failure, deleting the hooked and stored authentication message.

11. The method of claim 8, wherein the verification value is one of a random value, a hash value, and an electronic signature.

* * * * *